United States Patent [19]
Minoura et al.

[11] 4,352,541
[45] Oct. 5, 1982

[54] OPTICAL SCANNING DEVICE WITH CONSTANT SPEED SCAN

[75] Inventors: Kazuo Minoura; Setsuo Minami, both of Yokohama, Japan

[73] Assignee: Canon Kabushiki Kaisha, Tokyo, Japan

[21] Appl. No.: 971,439

[22] Filed: Dec. 20, 1978

[30] Foreign Application Priority Data

Dec. 23, 1977 [JP] Japan .................. 52/156158

[51] Int. Cl.³ .................. G02B 27/17; G02B 3/02
[52] U.S. Cl. .................. 350/6.6; 350/6.8; 350/416; 350/432
[58] Field of Search .................. 350/6.1–6.91, 350/175 R, 189, 175 SL, 194; 358/206–208, 293; 354/5

[56] References Cited

U.S. PATENT DOCUMENTS

| | | | |
|---|---|---|---|
| 2,475,275 | 7/1949 | Birchall | 350/189 |
| 2,811,081 | 10/1957 | Praeger | 350/189 |
| 3,573,849 | 4/1971 | Herriott | 350/6.8 |
| 3,687,025 | 8/1972 | Rosin | 354/5 |
| 3,946,150 | 3/1976 | Grafton | 358/293 |
| 3,961,838 | 6/1976 | Zanoni | 350/6.8 |
| 3,973,833 | 10/1976 | Lawson | 350/6.8 |
| 4,099,829 | 7/1978 | Straayer | 350/6.6 |

*Primary Examiner*—Jon W. Henry
*Attorney, Agent, or Firm*—Fitzpatrick, Cella, Harper & Scinto

[57] ABSTRACT

Optical scanning device of this invention includes an optical source to produce light rays, means for deflecting light rays toward a predetermined direction, a surface to be scanned by the deflected light rays, a single lens disposed between the deflecting means and the surface to focus the deflected light rays on the surface to be scanned, a partial optical system consisting of said deflecting means and the single lens having means to move light rays on the surface at a constant speed.

21 Claims, 14 Drawing Figures

OPTICAL SCANNING DEVICE WITH CONSTANT SPEED SCAN

BACKGROUND OF THE INVENTION

1. Field of the Invention

This invention relates to an optical scanning device to be used as reading or recording means for an image.

2. Description of the Prior Art

Heretofore, such optical scanning devices have been widely used in various fields, the scanning capability of which have been remarkably improved to meet various demands arising from the fields concerned. In view of a recent trend that the scanning devices are in most cases incorporated as a component element in systematized information processing apparatus such as terminal devices, etc., its miniaturization has been strongly desired.

For miniaturization of these devices, there can be contemplated various methods. One such method is to reduce the size of the scanning focussing lens system. However, reduction in number of the lens group consisting of the focussing lens system causes reduction in freedom of designing, correction in aberration, and introduces various other problems. One such problem resides in scanning a surface to be scanned at a constant speed.

For scanning the surface to be scanned at a constant speed, there have so far been known various prior arts. For example, U.S. Pat. No. 3,687,025 teaches scanning of a surface to be scanned at a constant speed by a scanning lens consisting of 4-lens construction, and U.S. Pat. No. 3,946,150 discloses scanning of a surface to be scanned at a constant speed by a scanning lens consisting 3-lens structure. U.S. Pat. No. 4,099,829 shows a structure where a small number of lenses constitutes a scanning lens. In this U.S. Patent, a single scanning lens is used for scanning a surface to be scanned. However, there is no teaching to scan the surface at a constant speed.

SUMMARY OF THE INVENTION

An object of this invention is to provide a compact scanning device by forming a focusing lens for scanning with a single lens.

A further object of this invention is to provide a scanning device to scan a surface at a constant speed using a single lens for scanning.

Another object of this invention is to provide a scanning device capable of scanning a surface to be scanned especially a plain surface with a superior focussing property with a single lens constituting a focussing lens for scanning.

In accordance with the scanning device of this invention, by suitably selecting moving characteristics of the deflecting device, e.g. equal angular velocity deflection or sinusoidal vibration deflection and the shape of the light source, deflecting device and scanning lens, distortion is corrected so that scanning speed on the surface to be scanned becomes constant.

In the scanning device of this invention, when the scanning lens is a spherical single lens, the moving or rotating characteristic is made as a sinusoidal vibration rotation and amplitude of the sinusoidal vibration is suitably selected so that relative to modulation signals of equal time interval, spot scan of constant distances on a surface to be scanned is achieved.

In the scanning device of this invention, an aspheric surface is used for a scan lens. In other words, an aspheric single lens is used as a scan lens, and spot scan of constant distance or space on the surface to be scanned is achieved. In this case, arbitrary amplitude of the sinusoidal vibration is used to obtain equi-distance spot scanning.

Further, in accordance with this invention, even a single lens is used for a scanning lens, it is possible to effectively utilize a plain surface to be scanned by positively using Petzval sum.

DESCRIPTION OF THE PREFERRED EMBODIMENT

Correction of aberration required of the scanning lens is such that, when the diameter D of an incident light beam is smaller than the focal length f of the lens, i.e., when the F-number is relatively low (dark), those aberrations related to the image angle such as the astigmatism III, the Petzval sum P, and the distortion V need be done, but no attention is required to be paid to the spherical aberration I and the coma II. Since the scanning lens in the scanning device according to the present invention has a relatively dark F-number, the correction of aberration should be done by paying attention to the abovementioned points.

According to the description in "Lens Designing" by Y, Matsui (published by Kyoritsu Publishing Co., Japan), the astigmatism III, the Petzval sum, and the distortion V with a lens having a thin thickness (a thin lens system) can be denoted as follows.

$$\begin{cases} III = a_{III}A_o + b_{III}B_o + c_{III} \\ P = \Psi P_o \\ V = a_V A_o + b_V B_o + c_V \end{cases} \quad (1)$$

When the lens consists of a thin lens system comprising i=1-m group, the astigmatism III, the Petzval sum, and the distortion V of the entire lens system can be described as follows.

$$\begin{cases} III = \sum_{i=1}^{m} III_i = \sum_{i=1}^{m} (a_{IIIi}A_{oi} + b_{IIIi}B_{oi} + c_{IIIi}) \\ P = \sum_{i=1}^{m} \Psi_i P_{oi} \\ V = \sum_{i=1}^{m} V_i = \sum_{i=1}^{m} (a_{Vi}A_{oi} + b_{Vi}B_{oi} + c_{Vi}) \end{cases} \quad (2)$$

$a_{III}$, $b_{III}$, $c_{III}$, $a_V$, $b_V$, $C_V$ in the equation (1) are characteristic coefficients which are the constants determined by the positions of the object point, the pupil, and the power. In the present invention, they depend on the positions of the light source, the deflecting mirror, and the power. A symbol $\Psi$ represents a power which is a reciprocal of the focal length of the thin lens system. $A_o$, $B_o$ and $P_o$ are eigen coefficients to be determined by the shape of the thin lens system and the refractive index thereof. A symbol i is a suffix to denote the ith thin lens system. III, P, and V are respectively the astigmatism, the Petzval sum, and the distortion coefficients of the entire lens consisting of m numbers of the thin lens system. Further, the sagittal field curvature IV can be described as follows.

$$IV = III + P \quad (3)$$

Figure 1:
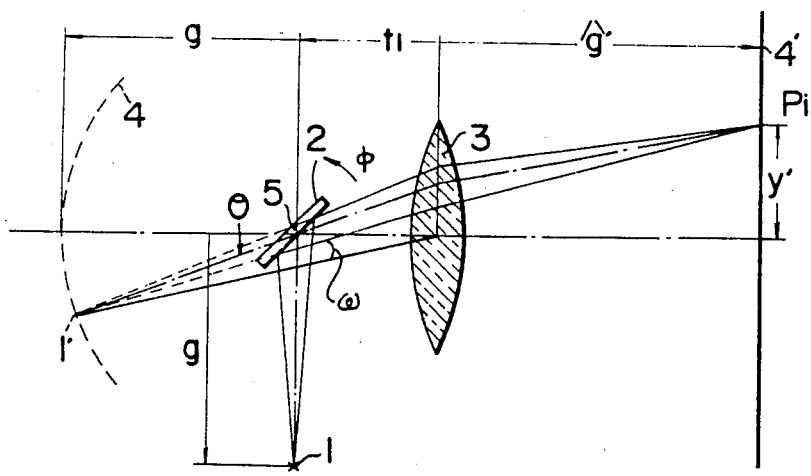
FIG. 1 is a drawing for illustrating a scanning device of this invention.

FIG. 1 shows the scanning device of this invention in which the light rays from the light source 1 are deflected by the deflecting device 2 and deflected light rays 3 are focussed on the surface 4' by the scanning lens 3.

As shown in FIG. 1, the position y' of the spot Pi on the surface 4' focussed by the scan lens 3 having the distortional coefficient V is represented by the following equations using deflecting angle $\theta$ ($=2\phi$; $\phi$ is the rotating angle of the deflecting mirror) within third order aberration.

$$y' = \bar{f}(\theta + U_3 \theta^3) \quad (4)$$

$$\begin{cases} \bar{f} = \dfrac{g g'}{g + t_1} \\ U_3 = \dfrac{1}{3} - \dfrac{1}{2}\left(\dfrac{g}{g + t_1}\right)^2 \cdot V \end{cases} \quad (5)$$

The scanned position relates to rotating characteristics of the deflecting device and distortional coefficient of the scanning lens, which is explained in the following.

The rotation of the deflecting device is shown by the following equation.

$$\theta = \theta_o \sin kt \quad (6)$$

Figure 2:
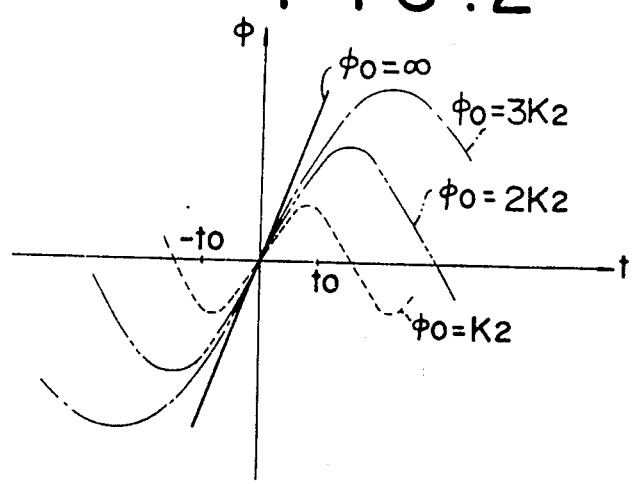
FIG. 2 shows a relation between $\phi$ and t in the equation $\phi = \phi_o \sin kt$, which is a sinusoidal characteristics of the deflecting device, by varying the value of $\phi_o$.

It is noted that $\phi$ is a rotating angle, $\phi_o$ is amplitude, k is a constant, and t is time. When t=0, the deflecting beam coincides with the optical axis of the scanning lens, and equation 6 is considered to show a rotating characteristic of the deflecting device within a definite time. Equation 6 has such meaning that assuming that amplitude is sufficiently large relative to a definite time interval, the rotation is deemed as equi-angular velocity deflection. On the other hand, if amplitude is not so large relative to a definite time interval, the rotation is sinusoidal vibration deflection. For example, by suitably selecting the value of k in response to $\phi_o$, the rotating characteristic varies as shown in FIG. 2. FIG. 2 shows a variation of the rotating angle $\phi$ for each case of $\phi_o = k_2$ (constant), $\phi_o = 2K_2$, $\phi_o = 3K_2$ and $\phi_o = \infty$, where $k = K_1/\phi_o$ ($K_1$ is constant), and within the range of $-t_o \sim t_o$, the variation of $\phi$ approaches a linear line proportional to time as $\phi_o$ increasing, and when $\phi = \infty$, $\phi$ becomes a linear line represented by $\phi = \phi_o \sin K_1/\phi_o t \approx K_1 t$.

In this invention, the rotating characteristic of the deflecting device is considered as equi-angular velocity or sinusoidal vibration deflection, and the equation (6) is used as a general equation representing the rotating characteristics.

As shown in FIG. 1, assume that the position of the focussed point Pi on the surface locates at y' from the optical axis of the scanning lens, and that the positional change of said position y' along with the rotation of the deflecting device is constant, i.e. equi-velocity scan, relative to the time change. When the time interval $\tau$ for lighting the light source is constant, it is possible to make scan spot interval constant by approaching the value of the distortional coefficient of the scanning lens to the following value of $V_o$.

$$V_o = \dfrac{1}{3}\left(\dfrac{g + t_1}{g}\right)^2 \left\{ 1 - \dfrac{1}{3}\left(\dfrac{1}{2\phi_o}\right)^2 \right\} \quad (7)$$

Equation (7) is the effective equation representing equivelocity scan.

An amplitude $\phi_o$ of the sinusoidal vibration type deflecting mirror is selected. It is assumed that the value of $V_o$ to be given by the equation (7) coincides with the value of the distortional coefficient V of the scanning lens. From the equations (5) and (7), the following equation is obtained.

$$U_3 = \dfrac{1}{6}\left(\dfrac{1}{2\phi_o}\right)^2 \quad (8)$$

When this is substituted for the equation (4), the following equation is derived.

$$y' = 2\phi_o \bar{f}\left\{ \left(\dfrac{\theta}{2\phi_o}\right) + \dfrac{1}{6}\left(\dfrac{\theta}{2\phi_o}\right)^3 \right\} \quad (9)$$

Since the equation (4) represents the scanning position to be defined by the third order aberration region, the equation (9) in this range is totally equivalent to the following equation. (When the equation (10) is developed by the third order of $\theta$ et seq., it becomes the equation (9).)

$$y' = 2\bar{\phi}_o f \sin^{-1}\left(\frac{\theta}{2\phi_o}\right) \quad (10)$$

Since $\theta = 2\phi_o \sin kt$, the equation (10) becomes as follows.

$$y' = 2k\bar{f}\bar{\phi}_o \cdot t$$

This equation is differentiated to derive the following equation.

$$dy' = 2k\bar{f}\bar{\phi}_o dt$$

In this instance, since the lighting time interval of the light source is constant, dt=constant. Accordingly, dy'=constant, and the interval of the scanning spots becomes also constant.

Next, when the deflector is of constant angular speed deflection, $U_3 = 0$. This is substituted for the equation (4) to obtain the following equation.

$$y = \bar{f} \cdot \theta$$

Since $\theta$ of the equal angular speed deflection, it is denoted as follows.

$$\theta = k't$$

(where k' is a constant) Accordingly, the following equation can be derived.

$$d\theta = k' dt$$

Hence, $$dy' = \bar{f} d\theta = k' \bar{f} dt$$

In this instance, since the lighting time of the light source is constant, dt is constant, hence dy' becomes constant, and the interval of the scanning spots becomes also constant.

Figure 3:
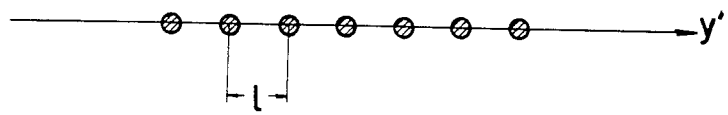
FIG. 3 shows equi-pitch scan on the surface to be scanned.

In the scanning device of the present invention, since it is a general practice to perform the spot scanning on the scanning surface by on-off operation of the light source (e.g. by use of a modulator) constant maintenance of the positional change in y' in relation to time lapse is the same as constant maintenance of the distance between the adjacent spots on the scanning surface in relation to a certain definite time interval. As shown in FIG. 3, a distance between the adjacent spots on the scanning surface is l, and the time interval corresponding to this distance is $\tau$.

Spherical single lens scan

Lens shape realizing Stigmatic focussing without Astigmatism (III) is determined as follows: In equation (1)

$$III = a_{III} A_o + b_{III} B_o + c_{III} = 0$$

and in a single lens there is the following relation between $A_o$ and $B_o$ $$A_o = Amn\, B_o^2 + Bmn\, B_o + Cmn \quad (11)$$

-continued $$\begin{cases} Amn = m_2/n_2^2 \\ Bmn = (m_2/n_2) - (2m_3 n_1/n_2^2) \\ Cmn = m_1 - (m_2 n_1/n_2) + (m_2 n_1^2/n_2^2) \end{cases}$$

therefore, $$B_o = \frac{-B'mn \pm \sqrt{B'mn - 4A'mn C'mn}}{2A'mn} \quad (12)$$

were $$\begin{cases} A'mn = a_{III} Amn \\ B'mn = a_{III} Bmn + b_{III} \\ C'mn = a_{III} Cmn + c_{III} \end{cases} \quad (13)$$

Further, the relation among the radii of curvatures R1 and R2 of the first and second surfaces of the lens and $B_o$ are given by, $$\begin{cases} R1 = \{n_2/(B_o - n_1)\} \cdot f \\ R2 = \{R1(1 - N)/(R1 - N + 1)\} \cdot f \end{cases} \quad (14)$$

Thus R1 and R2 are determined as $B_o$ has been obtained already. In this case, distortion coefficient V is determined by $$V = a_V A_o + b_V B_o + c_V \quad (15)$$
$$= a_V Amn\, B_o^2 + (a_V Bmn + b_V) B_o + a_V Cmn + c_V$$

Assuming $V = V_o$, from equation (7)

$$\phi_o = \frac{1}{2\sqrt{2 - 3\left(\frac{g}{g + t_1}\right)^2 \cdot V}} \quad (16)$$

Thus the amplitude $\phi_o$ of the rotating characteristic is obtained, and in case of using a spherical single lens, the deflecting device having the rotating characteristics of equation (16) is to be used.

Aspherical single lens scan

In general, the values of III and V of aspherical single lens are $$\begin{cases} III = a_{III} A_o + b_{III} B_o + c_{III} + a_{III} \Psi_e \\ V_o = a_V A_o + b_V B_o + c_V + a_V \Psi_e \end{cases} \quad (17)$$

$\Psi_e$ is the sum of aspherical coefficients of both surfaces of the lens and represented by $$\Psi_e = \sum_{\nu=1}^{2} (N'_\nu - N_\nu) b_\nu \quad (18)$$

Figure 4:
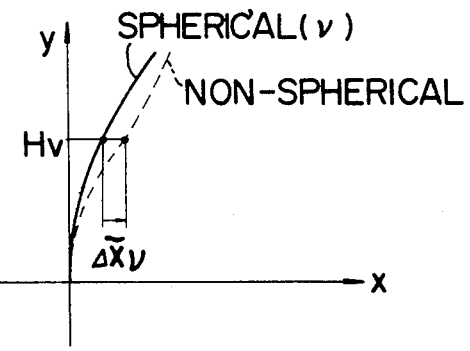
FIG. 4 shows difference $\Delta \tilde{x}_\nu$ between aspherical and spherical surfaces.

It is noted that $N_\nu$ and $N_\nu'$ are refractive indexes of the media before and after $\nu$ surface and $b_\nu$ is related with $\Delta \bar{x}_\nu$, which is the diviation of the aspherical surface from the spherical surface as shown in FIG. 4 and represented by $$\Delta \tilde{x}_\nu \equiv \frac{b_\nu}{8} H_\nu^4 \tag{19}$$

The number of aspherical surfaces may be one or two, and $A_o$ and $B_o$ are specific values assuming respective surfaces of the lens are deemed as paraxial radii of curvatures, and it will be determined when the $B_o$ is determined.

When desired values $III_o$ and $V_o$ are given to III and V, respectively, the shape of aspherical lens is given by $$\begin{cases} R1 = \{n_2/(B_o - n_1)\} \cdot f \\ R2 = \{R1(1-N)/(R1-N+1)\} \cdot f \end{cases} \tag{20}$$

$$B_o = \frac{(a_V III_o - a_{III} V_o) - (a_V c_{III} - a_{III} c_V)}{a_V b_{III} - a_{III} b_V} \tag{21}$$

$$\Psi_\phi = \frac{III_o - (a_{III} A_o + b_{III} B_o + c_{III})}{a_{III}} \tag{22}$$

Said desired values of $III_o$ and $V_o$ are given as $$\begin{cases} III_o = 0 \\ V_o = \tfrac{1}{2}\left(\dfrac{g+t_1}{g}\right)^2 \left(1 - \tfrac{1}{2}\left(\dfrac{1}{2\phi_o}\right)^2\right) \end{cases} \tag{23}$$

Independent values in the above equations (20) to (22) are $B_o$, $\Psi_e$ and $\phi_o$ and if one of these values is determined, the remaining two values are determined. For example, if rotating amplitude $\phi_o$ is determined, $B_o$ and $\Psi_e$ are determined, or if $B_o$ is determined, $\Psi_e$ and $\phi_o$ are determined.

Next, the explanation will be made for the case to scan a plain surface using a single scan lens. In this case, general equation (2) results in equation (1), and the of saggital field curvature is represented by $$IV = III + P \tag{24}$$

When the light source position is at an infinite distance from the deflector, relationships of $III = 0$ and $IV = 0$ should be established in the equations (1) and (24) in order that the scanning surface as the image forming plane of the scanning lens may be scanned without image surface curvature. However, when the scanning lens is a single lens made of glass materials having different refractive indexes N, the abovementioned two conditions $III = 0$ and $IV = 0$ are impossible to satisfy simultaneously, since the Petzval sum is $P = 1/N$ provided the focal length of the lens is $f = 1$. In other words, in the case of using the single lens, there remains the Petzval sum, hence it is only possible to correct either one of the astigmatism III or the sagittal field curvature IV. Accordingly, the focusing position Pi deviates from the scanning surface.

In contrast to this, when the light source position is at a finite distance, it is possible to correct both astigmatism and sagittal field curvature, even if the Petzval sum remains, whereby the image forming position on the scanning surface can be coincided. The present invention has succeeded in realizing this concept, the point of which will be described hereinbelow with further details referring to FIG. 1.

In FIG. 1, a light beam coming from the light source 1 at a finite distance is deflected by a deflecting mirror 2, passes through a scanning lens 3, and forms an image on the point Pi. A reference numeral 1' designates a virtual image of the light source 1 by the deflecting mirror, which image is on an arc 4 with a rotational axis 5 of the deflecting mirror 2 as the center of its rotation.

In the present invention, it is possible to form an image of the virtual light source on the arc 4 in FIG. 1 on the scanning surface 4' by adopting a lens shape which satisfies the following equation (25).

$$\begin{cases} III = 0 \\ IV = -\dfrac{1}{g} \end{cases} \tag{25}$$

(where: g represents a distance to the light source as measured from the deflecting mirror; in the present invention, the distance as measured in the travelling direction of the light beam is 'positive', while that as measured in the opposite direction as the travelling direction of the light beam is 'negative', hence the abovementioned distance g is in a relationship of $g<0$.)

From the equations (24) and (25), the following equation (26) is obtained.

$$P = -\frac{1}{g} \tag{26}$$

On the other hand, from the equation (1), $$P = \Psi P_o = 1/Nf \tag{27}$$

Hence the following equation (28) is obtained from the equations (26) and (27).

$$g = -Nf \tag{28}$$

(where: N is a refractive index of the glass material constituting the single lens, and f denotes a focal length of the lens.)

That is, when the distance g between the deflector and the light source is set to meet the equation (28), the virtual light source on the arc 4 can be formed on the scanning surface 4'. In the case of the single lens, the lens shape to correct the astigmatism and the sagittal field curvature so as to satisfy the equation (25) may be represented by the following equation (29) with the radius of curvature of the surface to the side of the deflector being $R_1$, the radius curvature of the surface to the side of the scanning surface being $R_2$, and the thickness of the lens being made thin.

$$\begin{cases} R_1 = \{n_2/(B_o - n_1)\} \cdot f \\ R_2 = \{R_1(1-N)/(R_1 - N + 1)\} \cdot f \end{cases} \tag{29}$$

(where: N is a refractive index of the lens, and f denotes a focal length thereof.)

Further, the following equations are established.

$$B_o = (-B_{III} \pm \sqrt{B_{III}^2 - 4C_{III} A_{III}})/2A_{III} \tag{30}$$

-continued $$\begin{cases} A_{III} = a_{III} m_3/n_2^2 \\ B_{III} = a_{III}(m_2/n_2 - 2m_3 n_1/n_2^2) + b_{III} \\ C_{III} = a_{III}(m_1 - m_2 n_1/n_2 + m_3 n_1^2/n_2^2) + c_{III} + P + 1/g \end{cases} \quad (31)$$

$$\begin{cases} n_1 \equiv N/(1-N) \\ n_2 \equiv (N+1)/N \\ m_1 \equiv \{N/(N-1)\}^2 \\ m_2 \equiv (2N+1)/(1-N) \\ m_3 \equiv (N+2)/N \end{cases} \quad (32)$$

In this instance, the value $A_o$ is determined by the following equations (from "Lens Designing" by Matsui).

$$A_o = A_{mn} B_o^2 + B_{mn} B_o + C_{mn} \quad (33)$$

$$\begin{cases} A_{mn} \equiv m_3/n_2^2 \\ B_{mn} \equiv (m_2/n_2) - (2m_3 n_1/n_2^2) \\ C_{mn} \equiv m_1 - (m_2 n_1/n_2) + (m_3 n_1^2/n_2^2) \end{cases} \quad (34)$$

Accordingly, the value of V in the equation (1) is determined by using the equations (29) to (34). That is, in the case of using the single lens, the distortional coefficient is eventually determined when the lens shape is so determined that the astigmatism and the field curvature may be corrected in accordance with the equation (25). In case of using a single lens, in which the aspherical surface has been introduced, a desired distortional coefficient V can be given to the lens upon correction of the astigmatism and the field curvature. In the distortion processing method for the single lens having the aspherical surface introduced therein, the rotational amplitude of the deflecting mirror need not be selected, but the equal pitch scanning can be realized by the lens shape to be found from the equations (20) to (22) with the value of $V_o$ determined from the equation (7) in correspondence to arbitrary rotational amplitude $O_o$ as the desired distortional coefficient. Further, when the aspherical single lens is introduced, the rotational characteristics of the deflector may be any one other than that represented by the equation (7).

As to the technique of scanning the light beam at a constant speed on the scanning surface, there is no limitation to the position of the light source in either case of using the spherical single lens or the aspherical single lens. Accordingly, there is no problem at all, if the light source exists in a finite position or an infinite position with respect to the deflector.

So far, the explanations have been given for both cases of using the spherical single lens and the aspherical single lens as the scanning lens, wherein the virtual light source on the arc 4 in FIG. 1 can be formed on the scanning surface, and the instant pitch scanning can be realized by setting the light source position, the deflecting mirror position, the lens shape, and so on.

In practice, determination of the light source position, the deflecting mirror position, and the lens shape can be satisfactorily done based on the principle of the present invention. Determination of the lens shape in accordance with the principle of the present invention has been done within a range of the third order aberration. This is for simplification of the explanation, and the actual designing including the high order aberration can be easily done by the ordinary designing technique on the basis of this principle.

Moreover, in this principle, the values of the astigmatism III and the Petzval sum P are respectively set at 0 and $-1/g$, although these values have some tolerance in the actual device. For example, when the rotating polygonal mirror not having its rotational center on the reflecting surface is used, even astigmatism coefficient III and Petzval sum P are corrected to the above mentioned values, curvature of the image remains on the focusing surface.

The quantities $\Delta M$ and $\Delta S$ of the field curvature in the respective meridional plane and the sagittal plane are given by the following equation ("Lens Designing" by Matsui).

$$\begin{cases} \Delta M = -\frac{g'}{2}(2\Delta III + \Delta IV)(\tan \omega)^2 \\ \Delta S = -\frac{g'}{2}\Delta IV(\tan \omega)^2 \end{cases} \quad (35)$$

In the above equation, $\Delta III$ and $\Delta IV$ are respectively the tolerances of the astigmatic coefficient and the field curvature coefficient, and are within the depth of focus to be determined by the diffraction limit of the image surface curvature quantities, as represented in the following.

$$\begin{cases} |\Delta M| \leq 2.44 \, Fe^2 \lambda \\ |\Delta S| \leq 2.44 \, Fe^2 \lambda \end{cases} \quad (36)$$

In the above equations, Fe denotes an effective F number of the lens, $\lambda$ is a wavelength of the light source and $\omega$ is the angle formed between the optical axis and a line connecting the scanning lens 3 and the virtual image 1', as shown in FIG. 1. In this case, the following relationship can also be established from FIG. 1.

$$\tan \omega = g \sin \theta / (g + t_1) \quad (37)$$

From the equation (35), (36), and (37), therefore, if $\Delta III$ and $\Delta IV$ satisfy the following equation, the field curvatures in the respective meridional plane and the sagittal plane fall within the depth of focus of the diffraction limit.

$$|2\Delta III + \Delta IV| \leq \frac{4.88 Fe^2 \lambda}{|g'|} \left(\frac{g+t_1}{g \sin \theta}\right)^2 \quad (38)$$

$$|\Delta IV| \leq \frac{4.88 Fe^2 \lambda}{|g'|} \left(\frac{g+t_1}{g \sin \theta}\right)^2$$

The tolerance $\Delta V$ of the distortion can be determined in the following manner. From the abovementioned equation (4), a small unsatisfactory quantity of the distortional coefficient value is $\Delta V$ and a deviation of the scanning position caused by unsatisfactory quantity is $\Delta y'$, whereby the following equations are obtained.

$$\Delta y' = \bar{f}\theta^3 \cdot \Delta U_3$$

$$\Delta U_3 = -\tfrac{1}{2}\left(\frac{g}{g+t_1}\right)^2 \cdot \Delta V$$

$$\therefore \Delta y' = -\frac{\hat{g}'}{2}\left(\frac{g}{g+t_1}\right)^3 \cdot \theta^3 \cdot \Delta V$$

If the tolerance of the deviation from the ideal position of the spot, when the deflecting angle is $\theta$, is set $Y'$, it is only sufficient that the value of the distortional coefficient may fall within the range satisfying the following equation with the desired value $V_o$ to be given by the equation (7) as the reference.

$$|\Delta V| \leq \frac{2}{|\hat{g}'|}\left(\frac{g+t_1}{g\theta}\right)^3 \cdot \Delta Y$$

As stated in the foregoing, the characteristic point of the scanning device according to the present invention resides in simplification of the construction of the scanning lens in utilization of the fact that the virtual light source to be formed by rotation of the mirror is on the arc when the light source at a finite position is scanned by the deflecting mirror on the scanning surface. When the scanning lens to be used is the spherical single lens, the spot scanning of the constant interval can be attained on the scanning surface with respect to the on-and-off (modulation) of the light source at time interval, by selecting the amplitude of the sinusoidal vibration in the rotational characteristic of the deflector.

When the scanning lens is the aspherical single lens, the virtual light source on the arc can be focussed on the scanning surface, and, further, the spot scanning of the equal distance interval can be attained with respect to any arbitrary amplitude $\phi_o$ with imposing restriction to the rotational characteristic of the deflector.

In the above explanation, equi-distance space spot is realized by setting distortion V of the single scanning lens, it is also possible to realize it by varying the time interval of ON-OFF of the light source. Namely, sinusoidal vibration amplitude $\phi_o$ is arbitrarily set, the ON-OFF time t of the light source is determined by the following equation in corresponding to distortional aberration coefficient V.

$$\tau = \frac{1}{2\, kf\phi \cos kt\, (1 + 12\phi_o^2\, U_3 \sin^2 kt)} \quad (39)$$

First Embodiment: Use of Spherical Single Lens

Figure 5:
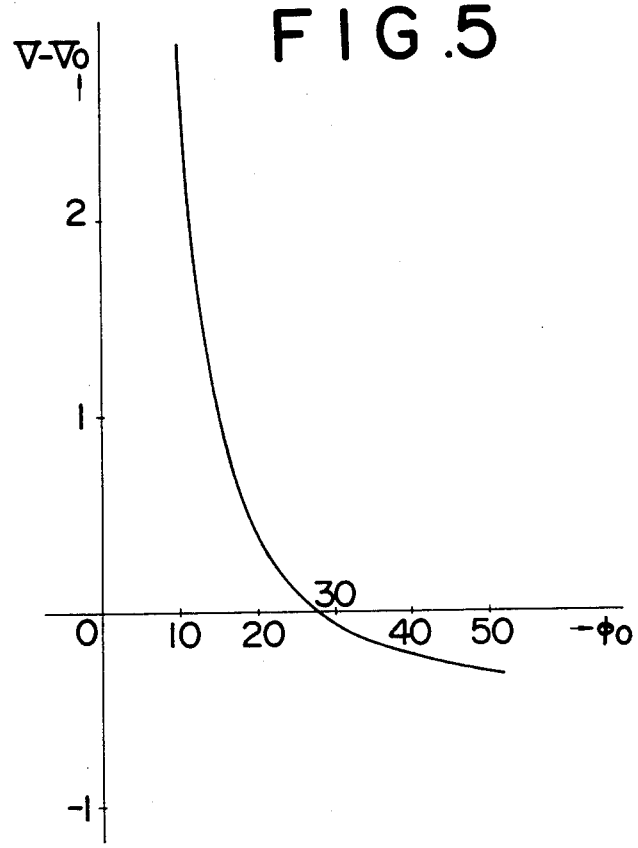
FIG. 5 shows an embodiment of this invention, in which the most suitable values of amplitude $\phi_o$ is shown for achieving equi-pitch scan while maintaining time interval given to light source constant.

Table 1 shows various data of the shape of the spherical single lens (radius of curvature on both surfaces) to form a focussed image spot on the scanning surface, the astigmatic coefficient III of the lens system, the ideal value $IV_o$ of the sagittal field curvature, the sagittal field curvature IV of the lens system, the ideal value $V_o$ of the distortional coefficient to realize the constant pitch scanning, the distortional coefficient $J$ of the lens system, and values of $IV-IV_o$ and $V-V_o$, when the parameters g and $t_1$ to determine the positions of the light source, the deflecting mirror, and the lens, and an amplitude $\phi_o$ to determine the rotational characteristic of the deflecting mirror. Table 1 indicates the unsatisfactory quantity of the distortion $(V-V_o)$ with respect to the constant pitch scanning in case the light source, the deflecting mirror, and the lens are disposed at definite positions $(g+t_1=-2, t_1=-0.2)$, and the amplitude of the sinusoidally vibrating deflecting mirror is changed to $\phi_o = 5 - \infty$. As is apparent from the Table, the place where the abovementioned value of $(V-V_o)$ is small, i.e., the amplitude $\phi_o$ of the deflecting mirror which can realize the constant pitch scanning with the time interval of the electrical signal being maintained constant, is in the vicinity of 25° to 30°. In other words, when the spherical single lens is used as the scanning lens, the constant pitch scanning with the time interval of the electrical signal being maintained constant can be realized by selecting the amplitude of the sinusoidally vibrating deflecting mirror. It will be seen from the Table that a bit more strict value of the amplitude is $\phi_o \div 27.5°$ from FIG. 5 which is a graphical representation of the Table 1, with $\phi_o$ being taken in the abscissa and $V-V_o$ in the ordinate. The lens shape in this case is $R_1 = -0.55718$ and $R_2 = -0.32843$ ($R_1$ denotes the surface at the light source side, and $R_2$ is that at the scanning surface side.) The lens is a thin lens.

In order to obtain the constant pitch scanning with respect to other amplitude, the time interval $\tau$ of the electrical signal may be set in accordance with the equation (39).

The constructional data (g, $t_1$, $\hat{g}'$, $R_1$, $R_2$) of each embodiment in Table 1 and the following Tables 2 to 9 are the results of regularization of the focal length f of the lens as $f=1$. The refractive index N of these lenses is $N=1.8$.

Tables 2 to 4 also show the embodiment of using the spherical single lens, in which the image forming position of the light source corresponding to the deflecting angle $\theta$ is separated from the scanning surface by a quantity $\Delta M$ (deviation of the image forming position in the meridional plane) and $\Delta S$ (deviation of the image forming position in the sagittal plane), each quantity satisfying the equation (36) on condition that the constant pitch scanning $(V-V_o=0)$ is carried out with the time interval of the electrical signal being maintained constant. The right side of the equation (36) represents the depth of focus to be determined by the diffractive limit due to the effective F-number Fe and the wavelength $\lambda$. The deviation of the image-forming position falls in the above-mentioned depth of focus, when $|\theta|=15°$, Fe=60, and $\lambda=6328$ A. (The depth of focus is +5.6 mm.)

Also, the equation (36) is equivalent to the equation (38). The non-satisfactory quantity of astigmatism III $(=\Delta III)$ and the unsatisfactory quantity of sagittal $IV-IV_o(=\Delta IV)$ in each embodiment of Tables 2 to 4 satisfy the equation (38), provided that $\hat{g}'$ in the equation (38) is calculated as $\hat{g}'=300$ mm, and, in the data of Tables 2 to 4, the focal length of the lens is regularized as $f=1$ mm. In more detail, in each construction of Tables 2 to 4, e.g., Ex. No. 20, when the distance g' between the lens and the scanning surface is actually set at 300 mm, the distance from the lens to the light source $(g+t_1)$ is 300 mm, the distance (g) from the deflecting mirror to the light source (g) is $-277.5$ mm, the distance ($t_1$) from the lens to the deflecting mirror is $-22.5$ mm, the radius of curvature ($R_1$) at the light source side of the lens is $-53.673$ mm, the radius of curvature ($R_2$) at the scanning surface side is $-37.086$, and the focal length (f) of this lens is 150 mm. In such actual construction, the deviation in the image-forming position falls within the abovementioned depth of focus ($\pm 5.6$ mm).

The deviation in the image-forming position also falls in the depth of focus (±5.6 mm) when the constructional data of the other embodiments in Tables 2 to 4 are proportionally converted with $\hat{g}'=300$ mm.

Table 2 shows a case of the amplitude of the deflecting mirror $\phi_o$ being 25°, Table 3 shows a case of the amplitude being 30°, and Table 4 shows a case of the amplitude being 35°. In each case, the distance from the lens to the light source $(g+t_1)$ and the distance from the lens to the deflecting mirror $t_1$ are changed variously. From the data on unsatisfactory quantity of astigmatism III and the unsatisfactory quantity of the sagittal (IV-$IV_o$) in these Tables 2 to 4, it will be seen that, when the value of the distance from the lens to the light source $(g+t_1)$ is $-2$ in either amplitude, they are favorable. In other words, when the value of $g+t_1$ is in the vicinity of $-2$, the deviation in the image-forming position from the scanning surface becomes the least.

When the abovementioned thin lens is replaced by a thick lens, the variation in aberration with increase in the lens thickness is small, provided that a value of d/f (thickness d of the lens divided by the focal length f) is small. Accordingly, thickening of the lens can be readily effected with the data of the thin lens as in these Tables 1 to 4.

Figure 6:
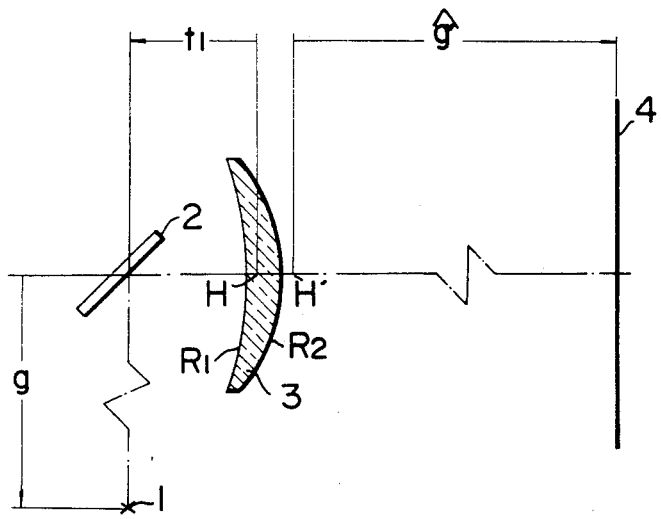
FIG. 6 shows an embodiment using a spherical single lens as a scanning lens.
Figures 7, 8:
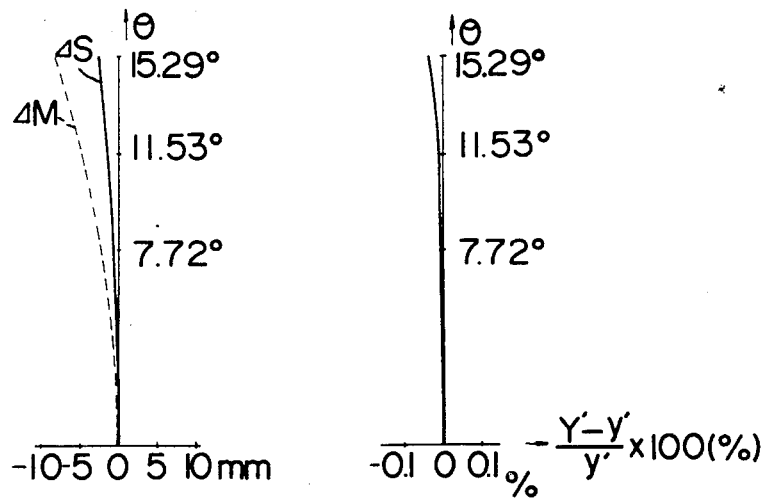
FIG. 7 shows field curvature, i.e. deviation of the focussing position from the surface 4' corresponding to the embodiment of FIG. 6.
FIG. 8 shows distortion characteristics corresponding to the embodiment shown in FIG. 6.

FIG. 6 indicates a construction which embodies the abovementioned concept, the constructional data of which are shown in Table 10, the aberration coefficient values of which are shown in Table 11, and a deviation in the image forming position from the scanning surface 4' of which are shown in FIG. 7. In FIG. 8, the ordinate represents the deflecting angle $\theta$, and the abscissa denotes a ratio of deviation in the actual image height (Y') in the construction to the ideal image height (y') represented by the equation (9) to attain the constant pitch scanning, $Y'-y'/y'\times 100(\%)$.

Second Embodiment: (Use of Aspherical Single Lens)

Tables 5 to 9 indicate the embodiments, wherein the aspherical lens is used.

Table 5 shows embodiments which attain the equal pitch scanning with the electrical signal time interval being maintained constant, and satisfies the condition of focusing the light source of the scanning surface. In these embodiments, the abovementioned two conditions are perfectly satisfied, even if the amplitude of the vibrating mirror is varied variously. In Tables 5 to 9, the constructional parameters other than $\Psi_e(\phi_o, \hat{g}+t_1, t_1 g', R_1, R_2)$ have the same meaning as those in the case of the spherical single lens. $\Psi_e$ represents an aspherical surface coefficient defined by the equations (18) and (19) as has been explained with regard to the principle of the present invention. The aberration coefficients III, IV-$IV_o$, V-$V_o$, $IV_o$, and $V_o$ are also of the same meaning as those explained in the embodiments of the spherical single lens. Although, in the case of the spherical single lens, achievement of the constant pitch scanning and the image-formation of the light source on the scanning surface could only be satisfied with respect to a particular amplitude of the vibrating mirror, the construction in Table 5 is capable of satisfying the two conditions with respect to various amplitudes due to introduction of the aspherical surface. This construction, as mentioned in the principle of the present invention, is applicable when the distance g from the deflecting mirror to the light source relates to the refractive index N of the lens and the focal length f as in the equation (28).

The embodiments in Tables 6 to 9 are such ones that the deviation in the image-forming position from the scanning surface falls in the depth of focus, and the constant pitch scanning can be attained with the electrical signal time interval being maintained constant, as is the case with the spherical single lens.

From these Tables, it is understood that the abovementioned two conditions can be satisfied with respect to various amplitudes, various distances from the lens to the light source, and various distances from the lens to the deflecting mirror. The point of difference from the case of using the spherical single lens is that the astigmatism can be perfectly corrected. In other words, in the case of using the spherical single lens, the lens shape is determined only by the condition of carrying out the constant pitch scanning with the electrical signal time interval being maintained constant, as already mentioned in respect of the principle of the present invention, in accordance with which shape the astigmatism III and sagittal field curvature IV can be determined. In contrast to this, when the aspherical lens is introduced, both conditions of carrying out the constant pitch scanning with the electrical signal time interval being maintained constant and correcting the astigmatism can be simultaneously satisfied, even if the abovementioned equation (28) cannot be perfectly met, although IV-$IV_o$ still remains.

The deviating quantities $\Delta M$ and $\Delta S$ of the image-forming position from the scanning surface, in the case of using the aspherical single lens, as shown in Tables 6 to 9, fall within the depth of focus (±5.6 mm) determined by the conditions of $\hat{g}'=300$ mm, $|\theta|\leq 15°$, Fe=60, and $\lambda=6328$ Å, and the constructional data are the result of regularization of f to f=1, as is the case with the spherical single lens.

Figure 9:
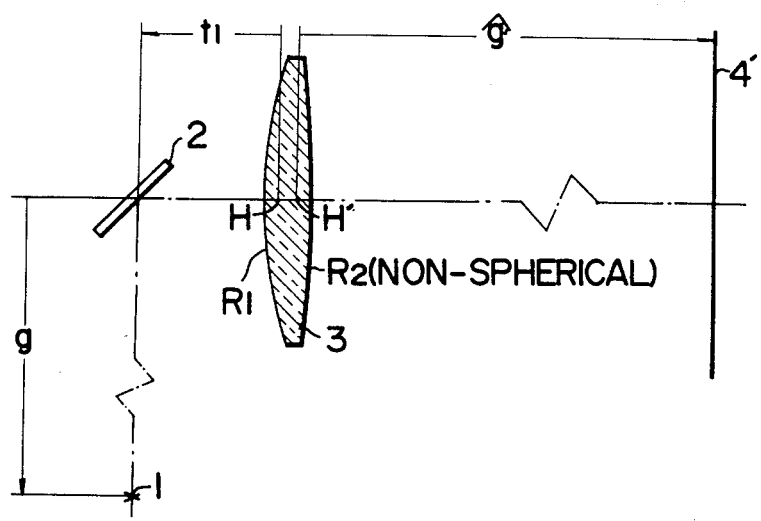
FIG. 9 shows an embodiment in which an aspherical single lens is used as scanning lens.
Figures 10, 11:
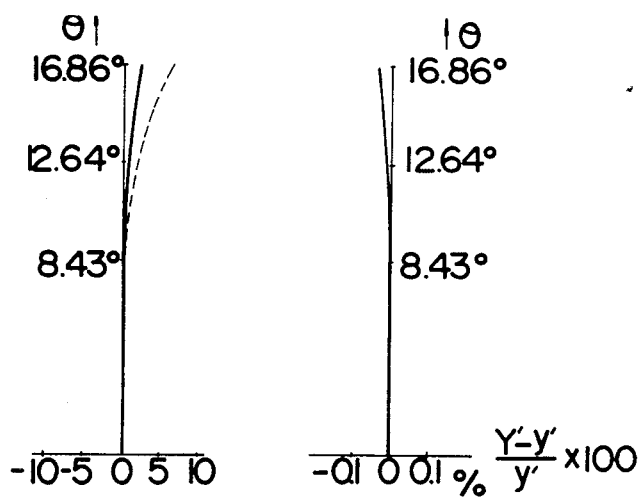
FIG. 10 shows field of curvature of the lens of FIG. 9.
FIG. 11 shows distortion property of the lens of FIG. 9.

Each of the embodiments in Tables 5 to 9 are for the thin lens data, as in the case of the spherical single lens. Even when the lens thickness is increased, the variation in the aberration is small, if the lens thickness d is smaller than the focal length, i.e., when d/f is small. Accordingly, correction of the aberration for this variation can be done easily by the ordinary technique. FIG. 9 shows the construction which embodies the concept, the structural data of which is shown in Table 12, the aberration coefficient values of which are shown in Table 13, and the deviation in the image forming position from the scanning surface 4' of which is shown in FIG. 10. In FIG. 11, the ordinance represents the deflecting angle $\theta$, and the abscissa denotes a ratio of the deviation in the actual image height (Y') in the construction to the ideal image height (y') represented by the equation (9) for attaining the constant pitch scanning, $Y'-y'/y'\times 100(\%)$.

Figure 12:
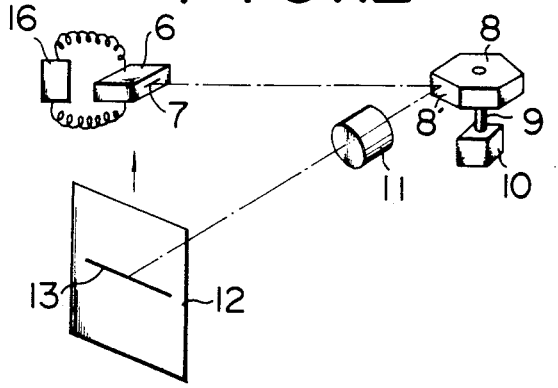
FIGS. 12 and 13 show a device applying the scanning device of this invention, FIG. 12 using a rotating polygonal mirror of equi-angular velocity as a deflecting mirror, and FIG. 13 using a sinusoidal vibrating mirror as a deflecting device.
Figure 13:
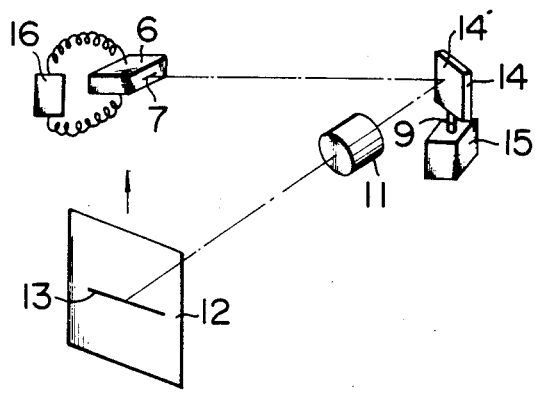
Figure 14:
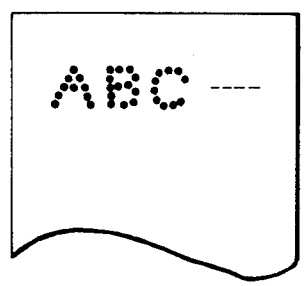
FIG. 14 shows an example of the image recorded by the scanning device of FIG. 13.

FIGS. 12 and 13 illustrate preferred embodiments, in which the scanning device of the present invention is applied. Either device uses a semiconductor laser as the light source. The device in FIG. 12 utilizes a rotatory polygonal mirror rotating at an equal angular speed as the deflecting device, while the device in FIG. 13 utilizes a galvano-mirror which sinusoidally vibrates. A reference numeral 6 designates a semiconductor laser, 7 a light emitting portion thereof, 8 a rotatory polygonal mirror, 9 a rotational shaft thereof, 10 a driving system, 8' a mirror surface, 11 a scanning lens, 12 a photosensitive recording medium, 13 a scanning line, 14 a galvano-mirror, 14' a mirror surface of the galvano mirror 14, and 15 a driving system for the galvano mirror. In the device of such construction, the record scanning speed of the record scanning line 13 can be made constant by maintaining positive relationship as mentioned in reference to the principle of the present invention among the light source position, the deflector position, the scanning lens position, the rotational characteristic of the deflector, and the construction of the scanning lens. Also, the spot recording as shown in FIG. 14 can be effected by controlling the modulating electric signal to be imparted to the semiconductor laser 6 by a modulating system 16, and moving orthogonally the recording medium 12 and the scanning line 13.

TABLE 1

| ex-No. | $\phi_0$ | $g + t_1$ | $t_1$ | $g'$ | $R_1$ | $R_2$ | $\Psi_l$ | III | IV-IV$_0$ | V-V$_0$ | IV$_0$ | V$_0$ |
|---|---|---|---|---|---|---|---|---|---|---|---|---|
| 1 | −5. | −2. | −0.2 | 2 | −0.55718 | −0.32843 | 0. | 0. | 13.06847 | 0.55556 | | −12.68645 |
| 2 | 10. | " | " | " | " | " | " | " | 2.93635 | " | | −2.55433 |
| 3 | 15. | " | " | " | " | " | " | " | 1.06003 | " | | −0.67801 |
| 4 | 20. | " | " | " | " | " | " | " | 0.40332 | " | | −0.02130 |
| 5 | 25. | " | " | " | " | " | " | " | 0.09936 | " | | 0.28267 |
| 6 | 30. | " | " | " | " | " | " | " | −0.06576 | " | | 0.44778 |
| 7 | 35. | " | " | " | " | " | " | " | −0.16532 | " | | 0.54734 |
| 8 | 50. | " | " | " | " | " | " | " | −0.30593 | " | | 0.68795 |
| 9 | ∞ | " | " | " | " | " | " | " | −0.44102 | " | | 0.82304 |

TABLE 2

| ex-No. | $\phi_0$ | $g + t_1$ | $t_1$ | $g'$ | $R_1$ | $R_2$ | $\Psi_l$ | III | IV-IV$_0$ | V-V$_0$ | IV$_0$ | V$_0$ |
|---|---|---|---|---|---|---|---|---|---|---|---|---|
| 10 | 25 | ∞ | −0.15 | 1. | −0.39958 | −0.26648 | | −0.10771 | 0.44784 | 0. | 0. | 0.22896 |
| 11 | 25 | ∞ | −0.175 | 1. | −0.38824 | −0.26139 | | −0.15230 | 0.40325 | 0. | 0. | 0.22896 |
| 12 | 25 | ∞ | −0.2 | 1. | −0.38157 | −0.25835 | | −0.14543 | 0.41013 | 0. | 0 | 0.22896 |
| 13 | 25 | ∞ | −0.225 | 1. | −0.36614 | −0.25118 | | −0.07578 | 0.47977 | 0. | 0. | 0.22896 |
| 14 | 25 | −4 | 0.125 | 1.33333 | −0.40668 | −0.26962 | | 0.03664 | 0.33413 | 0. | 0.25806 | 0.24397 |
| 15 | 25 | −4 | −0.15 | 1.33333 | −0.37743 | −0.25644 | | −0.07631 | 0.21951 | 0. | 0.25974 | 0.24715 |
| 16 | 25 | −4 | −0.175 | 1.33333 | −0.36920 | −0.25262 | | −0.12145 | 0.17267 | 0. | 0.26144 | 0.25039 |
| 17 | 25 | −4 | −0.2 | 1.33333 | −0.36496 | −0.25062 | | −0.11402 | 0.17838 | 0. | 0.26316 | 0.25369 |
| 18 | 25 | −4 | −0.225 | 1.33333 | −0.35285 | −0.24485 | | −0.04217 | 0.24848 | 0. | 0.26490 | 0.25706 |
| 19 | 25 | −2 | −0.125 | 2. | −0.38154 | −0.25833 | | 0.07146 | 0.09369 | 0. | 0.53333 | 0.26050 |
| 20 | 25 | −2 | −0.15 | 2. | −0.35782 | −0.24724 | | −0.04277 | −0.02775 | 0. | 0.54054 | 0.26759 |
| 21 | 25 | −2 | −0.175 | 2. | −0.35230 | −0.24459 | | −0.08852 | −0.08091 | 0. | 0.54794 | 0.27497 |
| 22 | 25 | −2 | −0.2 | 2. | −0.35038 | −0.24366 | | −0.08092 | −0.08092 | 0. | 0.55556 | 0.28267 |
| 23 | 25 | −2 | −0.225 | 2. | −0.34172 | −0.23944 | | −0.00841 | −0.01624 | 0. | 0.56338 | 0.29068 |
| 24 | 25 | −1.33333 | −0.125 | 4. | −0.35942 | −0.24800 | | 0.10853 | −0.16350 | 0. | 0.82759 | 0.27878 |
| 25 | 25 | −1.33333 | −0.15 | 4. | −0.34034 | −0.23876 | | −0.00683 | −0.29635 | 0. | 0.84507 | 0.29068 |
| 26 | 25 | −1.33333 | −0.175 | 4. | −0.33724 | −0.23723 | | −0.05325 | −0.36100 | 0. | 0.86331 | 0.30337 |
| 27 | 25 | −1.33333 | −0.2 | 4. | −0.33753 | −0.23738 | | −0.04591 | −0.37271 | 0. | 0.88235 | 0.31690 |
| 28 | 25 | −1.33333 | −0.225 | 4. | −0.33241 | −0.23483 | | 0.02553 | −0.32117 | 0. | 0.90226 | 0.33136 |

TABLE 3

| ex-No. | $\phi_0$ | $g + t_1$ | $t_1$ | $g'$ | $R_1$ | $R_2$ | $\Psi_l$ | III | IV-IV$_0$ | V-V$_0$ | IV$_0$ | V$_0$ |
|---|---|---|---|---|---|---|---|---|---|---|---|---|
| 29 | 30. | ∞ | −0.225 | 1. | −0.94889 | −0.43405 | | −0.06844 | 0.48711 | 0. | 0. | 0.36270 |
| 30 | 30. | ∞ | −0.25 | 1. | −0.90070 | −0.42368 | | −0.11048 | 0.44507 | 0. | 0. | 0.36270 |
| 31 | 30. | ∞ | −0.275 | 1. | −0.87175 | −0.41717 | | −0.12717 | 0.42838 | 0. | 0. | 0.36270 |
| 32 | 30. | ∞ | −0.3 | 1. | −0.84684 | −0.41138 | | −0.12047 | 0.43508 | 0. | 0. | 0.36270 |
| 33 | 30. | ∞ | −0.325 | 1. | −0.81409 | −0.40349 | | −0.08729 | 0.46827 | 0. | 0. | 0.36270 |
| 34 | 30. | −4. | −0.2 | 1.33333 | −0.89095 | −0.42151 | | 0.06015 | 0.35255 | 0. | 0.26316 | 0.40189 |
| 35 | 30. | −4. | −0.225 | 1.33333 | −0.82439 | −0.40601 | | −0.0135 | 0.27716 | 0. | 0.26490 | 0.40723 |
| 36 | 30. | −4. | −0.25 | 1.33333 | −0.79217 | −0.39803 | | −0.05475 | 0.23414 | 0. | 0.26667 | 0.41267 |
| 37 | 30. | −4. | −0.275 | 1.33333 | −0.77305 | −0.39315 | | −0.06929 | 0.21781 | 0. | 0.26846 | 0.41823 |
| 38 | 30. | −4. | −0.3 | 1.33333 | −0.75572 | −0.38861 | | −0.05842 | 0.22687 | 0. | 0.27027 | 0.42390 |
| 39 | 30. | −4. | −0.35 | 1.33333 | −0.67779 | −0.36692 | | 0.07836 | 0.35994 | 0. | 0.27397 | 0.43560 |
| 40 | 30. | −2. | −0.2 | 2. | −0.77573 | 0.39384 | | 0.12113 | 0.12113 | 0. | 0.55556 | 0.44778 |
| 41 | 30. | −2. | −0.225 | 2. | −0.72967 | −0.38161 | | 00.04774 | 0.03992 | 0. | 0.56338 | 0.46048 |
| 42 | 30. | −2. | −0.25 | 2. | −0.70831 | −0.37568 | | 0.00777 | −0.00811 | 0. | 0.57143 | 0.47373 |
| 43 | 30. | −2. | −0.275 | 2. | −0.69634 | −0.37229 | | −0.00413 | −0.02829 | 0. | 0.57971 | 0.48756 |
| 44 | 30. | −2. | −0.3 | 2. | −0.68498 | −0.36902 | | 0.01145 | −0.02123 | 0. | 0.58824 | 0.50201 |
| 45 | 30. | −2. | −0.325 | 2. | −0.66578 | −0.36337 | | 0.06095 | 0.01949 | 0. | 0.59701 | 0.51711 |
| 46 | 30. | −2. | −0.35 | 2. | −0.62061 | −0.34949 | | 0.17638 | 0.12587 | 0. | 0.60606 | 0.53290 |
| 47 | 30. | −1.33333 | −0.2 | 4. | −0.68736 | −0.36971 | | 0.18891 | −0.13788 | 0. | 0.88235 | 0.50201 |
| 48 | 30. | −1.33333 | −0.25 | 4. | −0.64170 | −0.35608 | | 0.07849 | −0.28903 | 0. | 0.92308 | 0.54942 |
| 49 | 30. | −1.33333 | −0.3 | 4. | −0.62889 | −0.35210 | | 0.09096 | −0.32122 | 0. | 0.96774 | 0.60387 |
| 50 | 30. | −1.33333 | −0.35 | 4. | −0.57880 | −0.33582 | | 0.28321 | −0.17818 | 0. | 1.01695 | 0.66685 |

TABLE

| ex-No. | $\phi_0$ | $g + t_1$ | $t_1$ | $g'$ | $R_1$ | $R_2$ | $\Psi_l$ | III | IV-IV$_0$ | V-V$_0$ | IV$_0$ | V$_0$ |
|---|---|---|---|---|---|---|---|---|---|---|---|---|
| 51 | 35. | ∞ | −0.275 | 1. | −1.59197 | −0.53244 | | −0.05592 | 0.49963 | 0. | 0. | 0.44335 |
| 52 | 35. | ∞ | −0.3 | 1. | −1.48415 | −0.51981 | | −0.0883 | 0.46726 | 0. | 0. | 0.44335 |
| 53 | 35. | ∞ | −0.325 | 1. | −1.41122 | −0.51057 | | −0.10192 | 0.45364 | 0. | 0. | 0.44335 |
| 54 | 35. | ∞ | −0.35 | 1. | −1.34903 | −0.50219 | | −0.09777 | 0.45778 | 0. | 0. | 0.44335 |
| 55 | 35. | ∞ | −0.375 | 1. | −1.28108 | −0.49247 | | −0.07420 | 0.48135 | 0. | 0. | 0.44335 |
| 56 | 35. | −4. | −0.25 | 1.33333 | −1.36884 | −0.50491 | | 0.06873 | 0.35762 | 0. | 0.26667 | 0.50443 |
| 57 | 35. | −4. | −0.275 | 1.33333 | −1.26203 | −0.48963 | | 0.01538 | 0.30248 | 0. | 0.26846 | 0.51122 |

TABLE -continued

| ex-No. | $\phi_0$ | $g + t_1$ | $t_1$ | $g'$ | $R_1$ | $R_2$ | $\Psi_l$ | III | $IV-IV_0$ | $V-V_0$ | $IV_0$ | $V_0$ |
|---|---|---|---|---|---|---|---|---|---|---|---|---|
| 58 | 35. | −4. | −0.3 | 1.33333 | −1.19976 | −0.47996 | −0.01489 | | 0.27040 | 0. | 0.27027 | 0.51815 |
| 59 | 35. | −4. | −0.325 | 1.33333 | −1.15582 | −0.47277 | −0.02478 | | 0.25867 | 0. | 0.27211 | 0.52523 |
| 60 | 35. | −4. | −0.35 | 1.33333 | −1.11545 | −0.46587 | −0.01453 | | 0.26706 | 0. | 0.27397 | 0.53245 |
| 61 | 35. | −4. | −0.375 | 1.33333 | −1.06661 | −0.45713 | 0.01915 | | 0.29885 | 0. | 0.27586 | 0.53982 |
| 62 | 35. | −4. | −0.4 | 1.33333 | −0.99259 | −0.44297 | 0.08853 | | 0.36631 | 0. | 0.27778 | 0.54734 |
| 63 | 35. | −2. | −0.25 | 2. | −1.11173 | −0.46522 | 0.14873 | | 0.13286 | 0. | 0.57143 | 0.57906 |
| 64 | 35. | −2. | −0.275 | 2. | −1.04728 | −0.45354 | 0.09719 | | 0.07304 | 0. | 0.57971 | 0.59597 |
| 65 | 35. | −2. | −0.3 | 2. | −1.00947 | −0.44631 | 0.07007 | | 0.03739 | 0. | 0.58824 | 0.61363 |
| 66 | 35. | −2. | −0.325 | 2. | −0.98216 | −0.44089 | 0.06517 | | 0.02371 | 0. | 0.59701 | 0.63208 |
| 67 | 35. | −2. | −0.35 | 2. | −0.95552 | −0.43537 | 0.08319 | | 0.03269 | 0. | 0.60606 | 0.65138 |
| 68 | 35. | −2. | −0.375 | 2. | −0.91894 | −0.42768 | 0.12953 | | 0.06970 | 0. | 0.61538 | 0.67158 |
| 69 | 35. | −2. | −0.4 | 2. | −0.85689 | −0.41373 | 0.22369 | | 0.15424 | 0. | 0.62500 | 0.69273 |
| 70 | 35. | −1.33333 | −0.25 | 4. | −0.93692 | −0.43153 | 0.24049 | | −0.12703 | 0. | 0.92308 | 0.67158 |
| 71 | 35. | −1.33333 | −0.3 | 4. | −0.87350 | −0.41757 | 0.16970 | | −0.24249 | 0. | 0.96774 | 0.73814 |
| 72 | 35. | −1.33333 | −0.35 | 4. | −0.83925 | −0.40958 | 0.19982 | | −0.26157 | 0. | 1.01695 | 0.81511 |
| 73 | 35. | −1.33333 | −0.4 | 4. | −0.76015 | −0.38978 | 0.38764 | | −0.12823 | 0. | 1.07143 | 0.90479 |

TABLE 5

| ex-No. | $\phi_0$ | $g + t_1$ | $t_1$ | $g'$ | $R_1$ | $R_2$ | $\Psi_l$ | III | $IV-IV_0$ | $V-V_0$ | $IV_0$ | $V_0$ |
|---|---|---|---|---|---|---|---|---|---|---|---|---|
| 74 | 15. | −2. | −0.2 | 2. | −0.06413 | −0.05937 | −349.79614 | 0. | 0. | 0. | 0.55556 | 0.67801 |
| 75 | 20. | −2. | −0.2 | 2. | −0.14194 | −0.12055 | −38.33231 | 0. | 0. | 0. | 0.55556 | 0.02130 |
| 76 | 25. | −2. | −0.2 | 2. | −0.32382 | −0.23051 | 1.36159 | 0. | 0. | 0. | 0.55556 | 0.28267 |
| 77 | 30. | −2. | −0.2 | 2. | −1.06529 | −0.45689 | −4.78577 | 0. | 0. | 0. | 0.55556 | 0.44778 |
| 78 | 35. | −2. | −0.2 | 2. | 2.79838 | −1.12026 | −17.91975 | 0. | 0. | 0. | 0.55556 | 0.54734 |
| 79 | 50. | −2. | −0.2 | 2. | 0.45708 | 1.06632 | −48.55060 | 0. | 0. | 0. | 0.55556 | 0.68795 |
| 80 | ∞ | −2. | −0.2 | 2. | 0.25339 | 0.37085 | −91.30540 | 0. | 0. | 0. | 0.55556 | 0.82304 |

TABLE 6

| ex-No. | $\phi_0$ | $g + t_1$ | $t_1$ | $g'$ | $R_1$ | $R_2$ | $\Psi_l$ | III | $IV-IV_0$ | $V-V_0$ | $IV_0$ | $V_0$ |
|---|---|---|---|---|---|---|---|---|---|---|---|---|
| 81 | 25. | −4. | −0.1 | 1.33333 | −3.79738 | −0.66079 | −60.22832 | 0. | 0.29915 | 0. | 0.25641 | 0.24085 |
| 82 | 25. | −4. | −0.2 | 1.33333 | −0.32382 | −0.23051 | 1.97357 | 0. | 0.29240 | 0. | 0.26361 | 0.25369 |
| 83 | 25. | −4. | −0.3 | 1.33333 | −0.41765 | −0.27440 | −2.06892 | 0. | 0.28529 | 0. | 0.27027 | 0.26759 |
| 84 | 25. | −4. | −0.4 | 1.33333 | −0.57445 | −0.33436 | −2.64545 | 0. | 0.27778 | 0. | 0.27778 | 0.28267 |
| 85 | 25. | −4. | −0.5 | 1.33333 | −0.79965 | −0.39991 | −2.48135 | 0. | 0.26984 | 0. | 0.28571 | 0.29905 |
| 86 | 25. | −4. | −0.6 | 1.33333 | −1.13274 | −0.46886 | −2.21888 | 0. | 0.26144 | 0. | 0.29412 | 0.31690 |
| 87 | 25. | −2. | −0.1 | 2. | −3.79738 | −0.66079 | −66.92630 | 0. | 0.02924 | 0. | 0.52632 | 0.25369 |
| 88 | 25. | −2. | −0.2 | 2. | −0.32382 | −0.23051 | 1.36159 | 0. | 0. | 0. | 0.55556 | 0.28267 |
| 89 | 25. | −2. | −0.3 | 2. | −0.41765 | −0.27440 | −1.92419 | 0. | −0.03268 | 0. | 0.58824 | 0.31690 |
| 90 | 25. | −2. | −0.4 | 2. | −0.57445 | −0.33436 | −2.36094 | 0. | −0.06944 | 0. | 0.62500 | 0.35775 |
| 91 | 25. | −2. | −0.5 | 2. | −0.79966 | −0.39991 | −2.18925 | 0. | −0.11111 | 0. | 0.66667 | 0.40704 |
| 92 | 25. | −2. | −0.6 | 2. | −1.13274 | −0.46886 | −1.95354 | 0. | −0.15873 | 0. | 0.71429 | 0.46726 |
| 93 | 25. | −1.33333 | −0.1 | 4. | −3.79738 | −0.66079 | −73.62383 | 0. | −0.25526 | 0. | 0.81081 | 0.26759 |
| 94 | 25. | −1.33333 | −0.2 | 4. | −0.32382 | −0.23051 | 0.74963 | 0. | −0.32680 | 0. | 0.88235 | 0.31690 |
| 95 | 25. | −1.33333 | −0.3 | 4. | −0.41765 | −0.27440 | −1.77958 | 0. | −0.41219 | 0. | 0.96774 | 0.38120 |
| 96 | 25. | −1.33333 | −0.4 | 4. | −0.57445 | −0.33436 | −2.07645 | 0. | −0.51587 | 0. | 1.07143 | 0.46726 |
| 97 | 25. | −1.33333 | −0.5 | 4. | −0.79966 | −0.39991 | −1.89715 | 0. | −0.64444 | 0. | 1.20000 | 0.58613 |
| 98 | 25. | −1.33333 | −0.6 | 4. | −1.13274 | −0.46886 | −1.68820 | 0. | −0.80808 | 0. | 1.36363 | 0.75689 |

TABLE 7

| ex-No. | $\phi_0$ | $g + t_1$ | $t_1$ | $g'$ | $R_1$ | $R_2$ | $\Psi_l$ | III | $IV-IV_0$ | $V-V_0$ | $IV_0$ | $V_0$ |
|---|---|---|---|---|---|---|---|---|---|---|---|---|
| 99 | 30. | −4. | −0.1 | 1.33333 | 0.11998 | 0.14115 | −431.46411 | 0. | 0.29915 | 0. | 0.25641 | 0.38154 |
| 100 | 30. | −4. | −0.2 | 1.33333 | −1.06529 | −0.45689 | −2.50203 | 0. | 0.29240 | 0. | 0.26316 | 0.40189 |
| 101 | 30. | −4. | −0.3 | 1.33333 | −0.69491 | −0.37188 | 0.50522 | 0. | 0.28529 | 0. | 0.27027 | 0.42390 |
| 102 | 30. | −4. | −0.4 | 1.33333 | −0.83096 | −0.40759 | −0.81306 | 0. | 0.27778 | 0. | 0.27778 | 0.44778 |
| 103 | 30. | −4. | −0.5 | 1.33333 | −1.10299 | −0.46369 | −1.34505 | 0. | 0.26984 | 0. | 0.28571 | 0.47373 |
| 104 | 30. | −4. | −0.6 | 1.33333 | −1.55283 | −0.52799 | −1.49994 | 0. | 0.26144 | 0. | 0.29412 | 0.50201 |
| 105 | 30. | −2. | −0.1 | 2. | 0.119988 | 0.14115 | −444.84839 | 0. | 0.02924 | 0. | 0.52632 | 0.40189 |
| 106 | 30. | −2. | −0.2 | 2. | −1.06529 | −0.45689 | −4.78577 | 0. | 0. | 0. | 0.55556 | 0.44778 |
| 107 | 30. | −2. | −0.3 | 2. | −0.69491 | −0.37188 | −0.09311 | 0. | −0.03268 | 0. | 0.58824 | 0.50201 |
| 108 | 30. | −2. | −0.4 | 2. | −0.83096 | −0.40759 | −0.94649 | 0. | 0.06944 | 0. | 0.62500 | 0.56672 |
| 109 | 30. | −2. | −0.5 | 2. | −1.10299 | −0.46369 | −1.32044 | .0. | −0.11111 | 0. | 0.66667 | 0.64480 |
| 110 | 30. | −2. | −0.6 | 2. | −1.55283 | −0.52799 | −1.42035 | 0. | −0.15873 | 0. | 0.71429 | 0.74021 |
| 111 | 30. | −1.33333 | −0.1 | 4. | 0.11998 | 0.14115 | −458.23267 | 0. | −0.25525 | 0. | 0.81081 | 0.42390 |
| 112 | 30. | −1.33333 | −0.2 | 4. | −1.06529 | −0.45689 | −7.06966 | 0. | −0.32680 | 0. | 0.88235 | 0.50201 |
| 113 | 30. | −1.33333 | −0.3 | 4. | −0.69491 | −0.37188 | −0.69149 | 0. | −0.41219 | 0. | 0.96774 | 0.60387 |
| 114 | 30. | −1.33333 | −0.4 | 4. | −0.83096 | −0.40759 | −1.07994 | 0. | −0.51587 | 0. | 1.07143 | 0.74021 |
| 115 | 30. | −1.33333 | −0.5 | 4. | −1.10299 | −0.46369 | −1.29584 | 0. | −0.64444 | 0. | 1.20000 | 0.92852 |
| 116 | 30. | −1.33333 | −0.6 | 4. | −1.55283 | −0.52799 | −1.34077 | 0. | −0.80808 | 0. | 1.36363 | 1.19901 |

TABLE 8

| ex-No. | $\phi_0$ | $g + t_1$ | $t_1$ | $g'$ | $R_1$ | $R_2$ | $\Psi_I$ | III | IV-IV$_0$ | V-V$_0$ | IV$_0$ | V$_0$ |
|---|---|---|---|---|---|---|---|---|---|---|---|---|
| 117 | 35. | −4. | −0.1 | 1.33333 | 0.07397 | 0.08151 | −806.14478 | 0. | 0.29915 | 0. | 0.25641 | 0.46637 |
| 118 | 35. | −4. | −0.2 | 1.33333 | 2.79840 | −1.12026 | −14.62793 | 0. | 0.29240 | 0. | 0.26316 | 0.49124 |
| 119 | 35. | −4. | −0.3 | 1.33333 | −1.15874 | −0.47326 | 0.19513 | 0. | 0.28529 | 0. | 0.27027 | 0.51815 |
| 120 | 35. | −4. | −0.4 | 1.33333 | −1.1137-12 | −0.46961 | −0.29738 | 0. | 0.27778 | 0. | 0.27778 | 0.54734 |
| 121 | 35. | −4. | −0.5 | 1.33333 | −1.43009 | −0.51302 | −0.90124 | 0. | 0.26984 | 0. | 0.28571 | 0.57906 |
| 122 | 35. | −4. | −0.6 | 1.33333 | −2.00009 | −0.57144 | −1.18283 | 0. | 0.26144 | 0. | 0.29412 | 0.61363 |
| 123 | 35. | −2. | −0.1 | 2. | 0.07397 | 0.08151 | −823.55981 | 0. | 0.02924 | 0. | 0.52632 | 0.49124 |
| 124 | 35. | −2. | −0.2 | 2. | 2.79838 | −1.12026 | −17.91975 | 0. | 0. | 0. | 0.55556 | 0.54734 |
| 125 | 35. | −2. | −0.3 | 2. | −1.15874 | −0.47326 | −0.85124 | 0. | −0.03268 | 0. | 0.58824 | 0.61363 |
| 126 | 35. | −2. | −0.4 | 2. | −1.13712 | −0.46961 | −0.68282 | 0. | −0.06944 | 0. | 0.62500 | 0.69273 |
| 127 | 35. | −2. | −0.5 | 2. | −1.43009 | −0.51302 | −1.03792 | 0. | −0.11111 | 0. | 0.66667 | 0.78817 |
| 128 | 35. | −2. | −0.6 | 2. | −2.00009 | −0.57144 | −1.21525 | 0. | −0.15873 | 0. | 0.71429 | 0.90479 |
| 129 | 35. | −1.33333 | −0.1 | 4. | 0.07397 | 0.08151 | −840.97778 | 0. | −0.25525 | 0. | 0.81081 | 0.51815 |
| 130 | 35. | −1.33333 | −0.2 | 4. | 2.79826 | −1.12026 | −21.21176 | 0. | −0.32680 | 0. | 0.88235 | 0.61363 |
| 131 | 35. | −1.33333 | −0.3 | 4. | −1.15874 | −0.47326 | −1.89762 | 0. | −0.41219 | 0. | 0.96774 | 0.73814 |
| 132 | 35. | −1.33333 | −0.4 | 4. | −1.13711 | −0.46961 | −1.06827 | 0. | −0.51587 | 0. | 1.07143 | 0.90479 |
| 133 | 35. | −1.33333 | −0.5 | 4. | −1.43010 | −0.51302 | −1.17461 | 0. | −0.14444 | 0. | 1.20000 | 1.13496 |
| 134 | 35. | −1.33333 | −0.6 | 4. | −2.00011 | −0.57144 | −1.24767 | 0. | −0.80808 | 0. | 1.36363 | 1.46560 |

TABLE 9

| ex-No. | $\phi_0$ | $g + t_1$ | $t_1$ | $g'$ | $R_1$ | $R_2$ | $\Psi_I$ | III | IV-IV$_0$ | V-V$_0$ | IV$_0$ | V$_0$ |
|---|---|---|---|---|---|---|---|---|---|---|---|---|
| 135 | ∞ | −4. | −0.2 | 1.33333 | 0.25339 | 0.37085 | −85.22180 | 0. | 0.29240 | 0. | 0.26316 | 0.73869 |
| 136 | ∞ | −4. | −0.3 | 1.33333 | 1.36585 | −1.93104 | −7.97508 | 0. | 0.28529 | 0. | 0.27027 | 0.77916 |
| 137 | ∞ | −4. | −0.4 | 1.33333 | 56.00597 | −0.81159 | −1.18272 | 0. | 0.27778 | 0. | 0.27778 | 0.82304 |
| 138 | ∞ | −4. | −0.5 | 1.33333 | −7.99979 | −0.72727 | −0.61979 | 0. | 0.26984 | 0. | 0.28571 | 0.87075 |
| 139 | ∞ | −4. | −0.6 | 1.33333 | −9.88239 | −0.74009 | −0.76164 | 0. | 0.26144 | 0. | 0.29412 | 0.92272 |
| 140 | ∞ | −2. | −0.2 | 2. | 0.25339 | 0.37085 | −91.30540 | 0. | 0. | 0. | 0.55556 | 0.82304 |
| 141 | ∞ | −2. | −0.3 | 2. | 1.36584 | −1.93104 | −10.26214 | 0. | −0.03268 | 0. | 0.58824 | 0.92272 |
| 142 | ∞ | −2. | −0.4 | 2. | 55.99443 | −0.81159 | −2.26606 | 0. | −0.06944 | 0. | 0.62500 | 1.04167 |
| 143 | ∞ | −2. | −0.5 | 2. | −7.99987 | −0.72727 | −1.20312 | 0. | −0.11111 | 0. | 0.66667 | 1.18518 |
| 144 | ∞ | −2. | −0.6 | 2. | −9.88233 | −0.74009 | −1.10423 | 0. | −0.15873 | 0. | 0.71429 | 1.36054 |
| 145 | ∞ | −1.33333 | −0.2 | 4. | 0.25339 | 0.37085 | −97.38901 | 0. | −0.32680 | 0. | 0.88235 | 0.92272 |
| 146 | ∞ | −1.33333 | −0.3 | 4. | 1.36584 | −1.93104 | −12.54919 | 0. | −0.41219 | 0. | 0.96774 | 1.10995 |
| 147 | ∞ | −1.33333 | −0.4 | 4. | 56.01366 | −0.81159 | −3.34936 | 0. | −0.51587 | 0. | 1.07143 | 1.36054 |
| 148 | ∞ | −1.33333 | −0.5 | 4. | −7.99999 | −0.72727 | −1.78645 | 0. | −0.64444 | 0. | 1.20000 | 1.70666 |
| 149 | ∞ | −1.33333 | −0.6 | 4. | −9.88293 | −0.74009 | −1.44683 | 0. | −0.80808 | 0. | 1.36363 | 2.20385 |

TABLE 10

| | |
|---|---|
| $\phi_0$ | 27.5° |
| $g + t_1$ | −300 |
| $t_1$ | −22.5 |
| $R_1$ | −73.89551 |
| $R_2$ | −47.10851 |
| d | 5. |
| N | 1.8 |

TABLE 11

| | |
|---|---|
| I | 15.86082 |
| II | −1.94748 |
| III | 0.17670 |
| P | 0.51300 |
| IV | 0.68970 |
| V | 0.35726 |
| IV$_0$ | 0.54054 |
| V$_0$ | 0.35638 |

TABLE 12

| | |
|---|---|
| $\phi_0$ | ∞ |
| $g + t_1$ | −300. |
| $t_1$ | −45. |
| $R_1$ | 145.95480 |
| $R_2$ | −654.26213 |
| $b_2$ | 4.3106 × 10$^{-6}$ |
| d | 10. |
| N | 1.8 |

TABLE 13

| | |
|---|---|
| I | −9.35168 |
| II | −3.02105 |

TABLE 13-continued

| | |
|---|---|
| III | 0. |
| P | 0.55866 |
| IV | 0.55866 |
| V | 0.92272 |
| IV$_0$ | 0.58824 |
| V$_0$ | 0.92272 |

What we claim is:

1. An optical scanning device comprising:
a light source for producing light rays;
means for deflecting light rays from the light source toward a predetermined direction;
a surface to be scanned by said deflected light rays;
single lens means having a distortion coefficient V disposed between the deflecting means and the surface for focusing the light rays deflected by the deflecting means; and
said deflecting means having a revolution angle $\phi_0 \sin kt$ within a definite time, where $\phi_0$ is an amplitude, k is a constant, and t is time, wherein the following equation is satisfied to make the moving velocity of a light beam on said surface constant;

$$\phi_0 = \frac{1}{2\sqrt{2 - 3\left(\frac{g}{g + t_1}\right)^2 V}}$$

where $t_1$ is the distance between said single lens means and said deflecting means measured from said single lens means toward said deflecting means; g is a distance between said deflecting means and the light source measured from the deflecting means toward the light source.

2. Scanning device according to claim 1, wherein the beam incident on said deflecting means is a divergent beam.

3. Scanning device according to claim 1, wherein the beam incident on said deflecting means is a parallel beam.

4. An optical scanning device comprising:
a light source for producing light rays;
deflecting means with an amplitude $\phi_0$ ($0 < \phi_0 \leq \infty$) having a revolution angle $\phi_0 \sin kt$ within a definite time, where k is constant and t is time;
a surface to be scanned by said deflected light rays;
single lens means disposed between the deflecting means and the surface for focusing the light rays deflected by the deflecting means; and
said single lens means having the following distortion coefficient V to make the moving velocity of a light beam on said beam on said surface constant:

$$V = \frac{1}{3}\left(\frac{g + [t]t_1}{g}\right)^2 \left\{1 - \frac{1}{2}\left(\frac{1}{2\phi_0}\right)^2\right\}$$

where $t_1$ is the distance between said single lens means and said deflecting means measured from said single lens means toward said deflecting means; g is the distance between said deflecting means and the light source measured from said deflecting means toward the light source.

5. Scanning device according to claim 1, wherein the beam incident on said deflecting means is a divergent beam.

6. Scanning device according to claim 1, wherein the beam incident on said deflecting means is a parallel beam.

7. An optical scanning device comprising:
a light source for producing light rays,
deflecting means with an amplitude $\phi_0$ ($0 < \phi_0 \leq \infty$) having a revolution angle $\phi_0 \sin kt$ within a definite time, where k is constant and t is time;
a surface to be scanned by said deflected light rays;
single lens means disposed between the deflecting means and the surface for focusing the light rays deflected by the deflecting means; and
said single lens means having the following distortion coefficient V to cause the moving velocity of a light beam on said surface to be substantially constant:

$$|V - V_0| \leq \frac{2}{|g'|}\left(\frac{g + t_1}{g \cdot \theta}\right)^3 \cdot \Delta Y'$$

$$V_0 = \frac{1}{3}\left(\frac{g + t_1}{g}\right)^2 \left\{1 - \frac{1}{2}\left(\frac{1}{2\phi_0}\right)^2\right\}$$

where, $V_0$ is an ideal distortion; $g'$ is the distance between said single lens means and said surface to be scanned measured from the single lens means toward the surface to be scanned; $\theta$ is a deflecting angle; $\Delta Y'$ is a deviation from the ideal scanning position Y', where $$Y' = 2\phi_0 \cdot \frac{gg'}{g + t_1} \cdot \sin^{-1}\left(\frac{\theta}{2\phi_0}\right),$$

$t_1$ is the distance between said single lens means and said deflecting means measured from said single lens means toward said deflecting means; g is the distance between said deflecting means and light source measured from said deflecting means toward the light source.

8. The scanning device according to claim 7, wherein the light ray incident on said deflecting means is a divergent beam.

9. The scanning device according to claim 7, wherein the light ray incident on said deflecting means is a parallel beam.

10. An optical scanning device comprising:
a light source for producing light rays;
means for deflecting light rays from the light source toward a predetermined direction for scanning a surface;
single lens means having a distortion coefficient V disposed between the deflecting means and the position of the surface for focusing the light rays deflected by the deflecting means;
said deflecting means having a revolution angle $\phi_0 \sin kt$ within a definite time, where $\phi_0$ is an amplitude, k is a constant and this time, wherein the following equation is satisfied to cause the moving velocity of a light beam on said surface to be constant:

$$\phi_0 = \frac{1}{2\sqrt{2 - 3\left(\frac{g}{g + t_1}\right)^2 V}}$$

where $t_1$ is the distance between said single lens means and said deflecting means measured from said single lens means toward said deflecting means; g is a distance between said deflecting means and the light source measured from the deflecting means toward the light source; and
the quantities $\Delta M$ of the field curvature of said single lens means in the meridional plane and the quantities $\Delta S$ of the field curvature of said single lens means in the sagittal plane satisfy the following equations $$|\Delta M| \leq 2.44 \, Fe^2 \cdot \lambda$$

$$|\Delta S| \leq 2.44 \, Fe^2 \cdot \lambda$$

where, Fe denotes an effective F number of said single lens means when the diameter of the beam incident on said single lens means is smaller than the focal length of said single lens means, and $\lambda$ is the wavelength of said light source.

11. Scanning device according to claim 10, wherein the light ray incident on said deflecting means is a divergent beam.

12. Scanning device according to claim 10, wherein the light ray incident on said deflecting means is a parallel beam.

13. An optical scanning device comprising:
a light source for producing light rays;
means for deflecting divergent light rays from the light source toward a predetermined direction;

a surface to be scanned by said deflected light rays;
single lens means having a distortion coefficient V disposed between the deflecting means and the surface for focusing the light rays deflected by the deflecting means;
said deflecting means having a revolution angle $\phi_0 \sin kt$ within a definite time, wherein $\phi_0$ is an amplitude, k is a constant, and t is time, wherein the following equation is satisfied to cause the moving velocity of a light beam on said surface to be constant:

$$\phi_0 = \frac{1}{2\sqrt{2 - 3\left(\frac{g}{g+t_1}\right)^2 V}}$$

wherein $t_1$ is the distance between said single lens means and said deflecting means measured from said single lens means toward said deflecting means; g is a distance between said deflecting means and the light source measured from the deflecting means toward the light source; and
said single lens means satisfies the following equation:

$$g = -Nf$$

where, N is the refractive power of said single lens means, and f is the focal length of said single lens means.

14. An optical scanning device comprising:
a light source for producing light rays;
deflecting means with an amplitude $\phi_0$ ($0 < \phi_0 \leq \infty$) having a revolution angle $\phi_0 \sin kt$ within a definite time, where k is constant and t is time;
a surface to be scanned by said deflected light rays;
single lens means disposed between the deflecting means and the surface for focusing the light rays deflected by the deflecting means;
said single lens means having the following distortion coefficient V to cause the moving velocity of a light beam on said surface to be constant:

$$V = \tfrac{1}{3}\left(\frac{g+t_1}{g}\right)^2\left(1 - \tfrac{1}{4}\left(\frac{1}{2\phi_0}\right)^2\right)$$

where $t_1$ is the distance between said single lens means and said deflecting means measured from said single lens means toward said deflecting means; g is the distance between said deflecting means and the light source measured from deflecting means toward the light source; and
the quantities $\Delta M$ of the field curvature of said single lens means in the meridional plane and the quantities $\Delta S$ of the field curvature of said single lens means in the sagittal plane satisfy the following equation $$|\Delta M| \leq 2.44 Fe^2 \lambda$$
$$|\Delta S| \leq 2.44 Fe^2 \lambda$$

where, Fe denotes an effective F number of said single lens means when the diameter of the beam incident on said single lens means is smaller than the focal length of said single lens means, and $\lambda$ is a wavelength of said light source.

15. Scanning device according to claim 14, wherein the light ray incident on said deflecting means is a divergent beam.

16. Scanning device according to claim 14, wherein the light ray incident on said deflecting means is a parallel beam.

17. An optical scanning device comprising:
a light source for producing light rays;
deflecting means with an amplitude $\phi_0$ ($0 < \phi_0 \leq \infty$) having a revolution angle $\phi_0 \cdot \sin kt$ within a definite time, where k is a constant and t is time;
a surface to be scanned by said deflected light rays;
single lens means disposed between the deflecting means and the surface for focusing the light rays deflected by the deflecting means;
said single lens means having the following distortion coefficient V to cause the moving velocity of a light beam on said beam on said surface to be constant:

$$V = \tfrac{1}{3}\left(\frac{g+t_1}{g}\right)^2\left(1 - \tfrac{1}{4}\left(\frac{1}{2\phi_0}\right)^2\right)$$

where $t_1$ is the distance between said single lens means and said deflecting means measured from said single lens means toward said deflecting means; g is the distance between said deflecting means and the light source measured from deflecting means toward the light source; and
said single lens means satisfies the following equation;

$$g = -Nf$$

where, N is the refractive power of said single lens means, and f is the focal length of said single lens means.

18. An optical scanning device comprising:
a light source for producing light rays;
deflecting means with an amplitude $\phi_0$ ($0 < \phi_0 \leq \infty$) having a revolution angle $\phi_0 \sin kt$ within a definite time, where k is constant and t is time;
a surface to be scanned by said deflected light rays;
single lens means disposed between the deflecting means and the surface for focusing the light rays deflected by the deflecting means;
said single lens means having the following distortion V to cause the moving velocity of a light beam on said surface to be constant:

$$|V - V_0| \leq \frac{2}{|\hat{g}'|}\left(\frac{g+t_1}{g \cdot \theta}\right) \cdot \Delta Y'$$

$$V_0 = \tfrac{1}{3}\left(\frac{g+t_1}{g}\right)^2\left(1 - \tfrac{1}{4}\left(\frac{1}{2\phi_0}\right)^2\right)$$

where, $V_0$ is an ideal distortion, $\hat{g}'$ is the distance between said single lens means and said the surface to be scanned, $\theta$ is a deflecting angle; $\Delta Y'$ is a deviation from the ideal scanning position Y', where $$Y = 2\phi_0 \cdot \frac{\hat{g}'}{g+t_1} \cdot \sin^{-1}\left(\frac{\theta}{2\phi_0}\right),$$

$t_1$ is the distance between said single lens means and the deflecting means measured from said single lens means toward the deflecting means; g is the distance between the deflecting means and the light source measured from deflecting means toward the light source; and the quantities $\Delta M$ of the field curvature of said single lens means in the meridional plane and the quantities $\Delta S$ of the field curvature of said single lens means in the sagittal plane satisfy the following equation:

$|\Delta M| \leq 2.44 Fe^2 \lambda$ $|\Delta S| \leq 2.44 Fe^2 \lambda$ where, Fe denotes an effective F number of said single lens means when the diameter of the beam incident on said single lens means is smaller than the focal length of said single lens means, and $\lambda$ is a wavelength of said light source.

19. The scanning device according to claim 18, wherein the light ray incident on said deflecting means is a divergent beam.

20. The scanning device according to claim 18, wherein the light ray incident on said deflecting means is a parallel beam.

21. A scanning device comprising:
a light source for producing divergent light rays;
deflecting means with an amplitude $\phi_0$ ($0 < \phi_0 \leq \infty$) having a revolution angle $\phi_0 \sin kt$ within a definite time, where k is a constant and t is time;
a surface to be scanned by said deflected light rays;
single lens means disposed between the deflecting means and the surface for focusing the light rays deflected by the deflecting means;
said single lens means having the following distortion V to cause the moving velocity of a light beam on said surface to be constant:

$$|V - V_0| \leq \frac{2}{|g'|} \left( \frac{g + t_1}{g \cdot \theta} \right)^3 \cdot \Delta Y'$$

$$V_0 = \frac{1}{3} \left( \frac{g + t_1}{g} \right)^2 \left\{ 1 - \frac{1}{3} \left( \frac{1}{2\phi_0} \right)^2 \right\}$$

where, $V_0$ is an ideal distortion; $g'$ is the distance between said single lens means and said the surface to be scanned, $\theta$ is a deflecting angle; $\Delta Y'$ is a deviation from the ideal scanning position $Y'$, where $$Y' = 2\phi_0 \cdot \frac{g g'}{g + t_1} \cdot \sin^{-1} \left( \frac{\theta}{2\phi_0} \right),$$

$t_1$ is the distance between said single lens means and the deflecting means measured from said single lens means toward the deflecting means; g is the distance between said deflecting means and light source measured from deflecting means toward the light source; and said single lens means satisfies the following equation:

$g = -Nf$ where, N is the refractive power of said single lens means, and f is the focal length of said single lens.

* * * * *

UNITED STATES PATENT AND TRADEMARK OFFICE
CERTIFICATE OF CORRECTION

PATENT NO. : 4,352,541

DATED : October 5, 1982

INVENTOR(S) : KAZUO MINOURA, ET AL.

It is certified that error appears in the above-identified patent and that said Letters Patent is hereby corrected as shown below:

COLUMN 2

Line 6, change "even a" to --even though a--.

Line 10, change "using Petzval" to --using the Petzval--.

Line 36, change "field of curvature" to --field curvature--.

COLUMN 5

First Equation:

Change "$y' = 2\tilde{\phi}_o f \sin^{-1} [\frac{\theta}{2\phi_o}]$" to --$y' = 2\phi_o \tilde{f} \sin^{-1} (\frac{\theta}{2\phi_o})$--.

COLUMN 5

Fourth Equation:

Change "$y = \tilde{f} \cdot \theta$" to --$y' = \tilde{f} \cdot \theta$--.

COLUMN 5

Line 26, change "Since θ of" to --Since θ is of--.

UNITED STATES PATENT AND TRADEMARK OFFICE
CERTIFICATE OF CORRECTION

PATENT NO. : 4,352,541
DATED : October 5, 1982
INVENTOR(S) : KAZUO MINOURA, ET AL.

It is certified that error appears in the above-identified patent and that said Letters Patent is hereby corrected as shown below:

COLUMN 6

Equation 17:

Change "$V_o = a_v A_o$" to --$V = a_v A_o$--.

COLUMN 7

Line 40, change "and the of" to --and the--.

COLUMN 9

Line 57, change "instant" to --constant--.

COLUMN 10

Lines 26 and 27, change "and the field curvature" to --and the sagittal field curvature--.

COLUMN 11

Line 31, after "at" insert --a constant--.

Line 38, change "with" to --without--.

UNITED STATES PATENT AND TRADEMARK OFFICE
CERTIFICATE OF CORRECTION

PATENT NO. : 4,352,541
DATED : October 5, 1982
INVENTOR(S) : KAZUO MINOURA, ET AL.

It is certified that error appears in the above-identified patent and that said Letters Patent is hereby corrected as shown below:

COLUMN 12

Line 47, change "$\lambda = 6328A$" to --$\lambda = 6328\text{Å}$--.

Line 57, change "$g'$" to --$\hat{g}'$--.

COLUMN 13

Line 49, change "$\Psi_e(\phi_o, \hat{g}+t_1, t_1 g')$" to --$\Psi_e(\phi_o, g+t_1, t_1 \hat{g}')$--.

COLUMNS 15 and 16

TABLE 1:

In Column 5 of TABLE 1, change "$g'$" to --$\hat{g}'$--.

COLUMNS 15 and 16

TABLE 2:

In Column 5 of TABLE 2, change "$g'$" to --$\hat{g}'$--.

UNITED STATES PATENT AND TRADEMARK OFFICE
CERTIFICATE OF CORRECTION

PATENT NO. : 4,352,541

DATED : October 5, 1982

INVENTOR(S) : KAZUO MINOURA, ET AL.

It is certified that error appears in the above-identified patent and that said Letters Patent is hereby corrected as shown below:

COLUMNS 15 and 16

TABLE 3:

In Column 5 of TABLE 3, change "g'" to $--\hat{g}'--$.

COLUMNS 15 and 16

IN LAST TABLE:

Change "TABLE" to --TABLE 4--, and in Column 5 of TABLE 4, change "g'" to $--\hat{g}'--$.

COLUMNS 17 and 18

Change "TABLE -continued" to --TABLE 4 -continued--, and in Column 5 of "Table 4 -continued", change "g'" to $--\hat{g}'--$.

COLUMNS 17 and 18

TABLE 5:

In Column 5 of TABLE 5, change "g'" to $--\hat{g}'--$.

UNITED STATES PATENT AND TRADEMARK OFFICE
CERTIFICATE OF CORRECTION

PATENT NO. : 4,352,541

DATED : October 5, 1982

INVENTOR(S) : KAZUO MINOURA, ET AL.

It is certified that error appears in the above-identified patent and that said Letters Patent is hereby corrected as shown below:

COLUMNS 17 and 18

TABLE 6:

In Column 5 of TABLE 6, change "g'" to --$\hat{g}'$--.

COLUMNS 17 and 18

TABLE 7:

In Column 5 of TABLE 7, change "g'" to --$\hat{g}'$--.

COLUMNS 19 and 20

TABLE 8:

In Column 5 of TABLE 8, change "g'" to --$\hat{g}'$--.

COLUMNS 19 and 20

TABLE 9

In Column 5 of TABLE 9, change "g'" to --$\hat{g}'$--.

UNITED STATES PATENT AND TRADEMARK OFFICE
CERTIFICATE OF CORRECTION

PATENT NO. : 4,352,541
DATED : October 5, 1982
INVENTOR(S) : KAZUO MINOURA, ET AL.

It is certified that error appears in the above-identified patent and that said Letters Patent is hereby corrected as shown below:

COLUMN 21

Line 34, change "claim 1" to --claim 4--.

Line 36, change "claim 1" to --claim 4--.

COLUMN 22

Line 1, change "$g\hat{g}$" to --$g\hat{g}'$--.

Signed and Sealed this

Twenty-ninth Day of March 1983

[SEAL]

Attest:

GERALD J. MOSSINGHOFF

Attesting Officer  Commissioner of Patents and Trademarks